United States Patent

[11] 3,584,294

| | | |
|---|---|---|
| [72] | Inventor | Eric I. Siwko |
| | | Marlboro, Mass. |
| [21] | Appl. No. | 653,797 |
| [22] | Filed | July 17, 1967 |
| [45] | Patented | June 8, 1971 |
| [73] | Assignee | Fenwal, Inc. |
| | | Ashland, Mass. |

[54] A SYSTEM FOR MEASURING LOW LEVELS OF ELECTRICAL ENERGY
9 Claims, 3 Drawing Figs.

[52] U.S. Cl. ................................................. 324/111,
317/149, 340/253
[51] Int. Cl. ..................................................... G01r 1/00,
H01h 47/28, G08b 21/00
[50] Field of Search............................................ 324/111,
99, 99 D, 133, 76, 102, 103, 154; 340/252, 253;
328/150, 151; 320/1; 317/149

[56] References Cited
UNITED STATES PATENTS

| | | | | |
|---|---|---|---|---|
| 1,830,170 | 11/1931 | Lindenbald.................. | 324/111 X |
| 3,316,547 | 4/1967 | Ammann..................... | 324/99 X |
| 1,851,947 | 3/1932 | Mirick......................... | 324/103 X |
| 2,558,670 | 6/1951 | Breen et al................... | 324/154 X |
| 1,704,520 | 3/1929 | Sommer ..................... | 324/103 X |
| 2,804,268 | 8/1957 | Davis........................... | 324/111 X |

OTHER REFERENCES

Van Allen, R. L.; " Four Quadrant Multiplication With Transistors and Magnetic Cores" ; AMERICAN INSTITUTE OF ELECTRICAL ENGINEERS-TRANSACTIONS: Vol. 74; Part I; November 1955; pages 643— 647

*Primary Examiner*—Rudolph V. Rolinec
*Assistant Examiner*—Ernest F. Karlsen
*Attorney*—John E. Toupal

ABSTRACT: An apparatus for detecting or measuring extremely low electrical energy levels derived from environmental condition responsive energy sources. The energy output of the source is accumulated in an energy storage device and periodically discharged into a measuring circuit.

Inventor:
Eric I. Siwko,
by John E. Toupal
Attorney

A SYSTEM FOR MEASURING LOW LEVELS OF ELECTRICAL ENERGY

This invention relates generally to a device for sensing extremely low energy electrical signals and, more particularly, relates to such a device for sensing signals produced by environmental condition detectors.

There are currently in use several types of electrical energy sources which detect changes in given environmental conditions. These detectors include, for example, thermocouple elements responsive to changes in ambient temperature or pressure, ion sources responsive to changes in vacuum pressure, piezoelectric crystals responsive to changes in pressure, photoelectric cells responsive to changes in radiation intensity, etc. Because the electrical energy levels generated by such detectors in many applications are extremely low, effecting useful functions with the electrical signals produced thereby sometimes is difficult. Accordingly, conventional techniques for accurately measuring or detecting the signals or for performing control functions therewith generally require relatively expensive electrical components. For example, the low energy voltage signal generated by a thermocouple element normally is amplified with an electromechanical amplifier including an expensive high frequency mechanical chopper for converting the produced DC signal into AC Similarly, relatively expensive electrometer amplifiers are commonly utilized for detection of low energy electrical current signals produced by piezoelectric crystals and ion sources.

The object of this invention, therefore, is to provide a relatively low cost instrument which can accurately sense the low energy signals produced by environmental condition responsive sources of electrical energy.

One feature of this invention is the provision of a sensing instrument including an energy storage device for accumulating electrical energy received from a condition responsive energy source. The instrument further includes an electrical switch which periodically discharges energy from the energy storage device into an output and measurement circuit which measures the discharged energy. By accumulating the energy produced by the condition responsive source, periodic measurements can be made of higher and therefore more easily detectable energy levels.

Another feature of this invention is the provision of a sensing instrument of the above featured type wherein the measuring circuit produces an amplified control signal upon receipt of a predetermined level of discharged energy. The amplified control signal can be used for any desired function including regulation of the sensed environmental condition, measurement of the sensed condition, indicating any variation of the condition from predetermined acceptable norms, etc.

Another feature of this invention is the provision of a sensing instrument of the above featured type including a mechanism for controlling the electrical switch so as to produce energy storage periods of predetermined uniform length between periods of energy discharge and measurement. The use of uniform energy storage periods simplifies evaluation of the measured energy and permits calibration of the measurement circuit for direct response to the sensed variable condition.

Another feature of this invention is the provision of a sensing instrument of the above featured type wherein the electrical switch is a relay having switch contacts and a periodically energized relay winding. Because of a low frequency requirement, the periodically actuated switch contacts are relatively inexpensive and effectively produce the alternate energy storing and energy discharge periods.

Another feature of this invention is the provision of a sensing instrument of the above featured types wherein the measuring circuit includes a solid state switching circuit actuated by the predetermined energy level to produce the amplified control signal. Solid state switching circuits are uniquely suited for actuation by the discharging energy provided by the energy storing device.

Another feature of this invention is the provision of a sensing instrument of the above featured type wherein the energy storage device comprises a magnetic core and the output circuit comprises an electrical winding surrounding the magnetic core and connected to the condition responsive source by the electrical switch contacts. This arrangement is preferred for applications wherein the condition responsive source is a low energy voltage source.

Another feature of this invention is the provision of a sensing instrument of the next above featured type wherein the energy storage device comprises an electrical capacitor connected to the condition responsive source and to the output and measurement circuit by the periodically actuated switch contacts. This arrangement is preferred for applications wherein the condition responsive source is a low energy current source.

Another feature of this invention is the provision of a sensing instrument of the above featured type wherein the output circuit comprises a transformer having a primary winding connected across the capacitor and a secondary winding connected to the measuring circuit. The use of a transformer to step up the signal produced by the discharging capacitor simplifies the requirements of the measuring circuit.

These and other objects ad features of the present invention will become more apparent upon a perusal of the following specification taken in conjunction with the accompanying drawings wherein.

Figure 1:
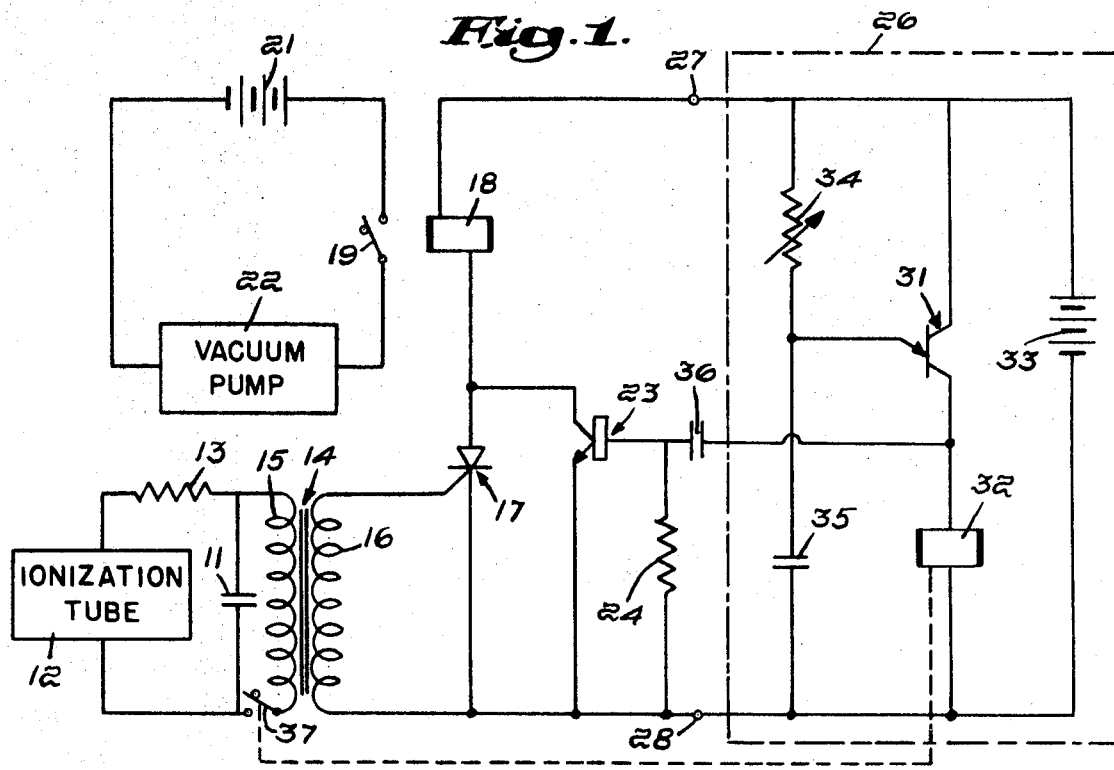
FIG. 1 is a schematic diagram of one embodiment of the invention.

Referring now to FIG. 1, there is shown the storage capacitor 11 connected across the series combination of the ionization tube 12 and the resistor 13. The output transformer 14 has a primary winding 15 connected in parallel with the capacitor 11 and a secondary winding 16 coupled across the gate and cathode electrodes of the silicon controlled rectifier 17. Connected to the anode electrode of the silicon controlled rectifier 17 is the control relay winding 18. The normally open relay contacts 19 are connected in series between the battery 21 and the conventional vacuum pump 22 which can be, for example, of either the sputter ion or getter ion type. Connected to the anode and cathode electrodes of the rectifier 17 are the collector and emitter electrodes of the NPN transistor 23.

The unijunction oscillator 26 has a positive terminal 27 connected to the control relay winding 18 and a negative terminal 28 connected to the cathode electrode of the rectifier 17 and to the emitter electrode of the transistor 23. Comprising the unijunction oscillator 26 are the unijunction transistor 31 and chopper relay winding 32 connected in series across the battery 33. Also connected in parallel with the battery 33 are the series connected variable resistor 34 and capacitor 35. The junction between the resistor 34 and the capacitor 35 is connected to the emitter electrode of the transistor 31 and the junction between the transistor 31 and the chopper relay winding 32 is coupled to the base electrode of the transistor 23 by the capacitor 36. The normally open chopper relay contacts 37 are connected between the storage capacitor 11 and the primary winding 15 of the output transformer 14.

Figure 2:
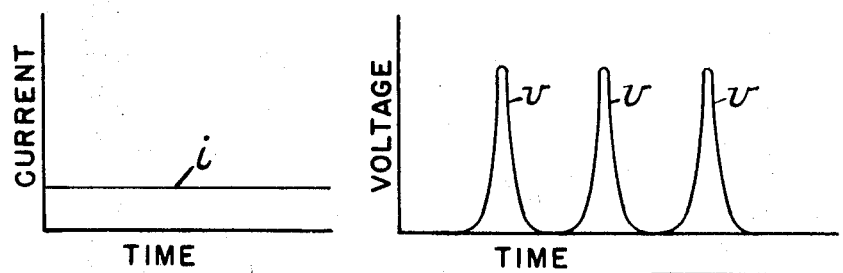
FIG. 2 shows input current and output voltage vs. time curves for the circuit shown in FIG. 1.

During typical use of the invention embodiment shown in FIG. 1, the ionization tube 12 would be positioned to sense the vacuum pressure in a particular environment such as that within a vacuum chamber (not shown). The ionization tube 12 operates in the conventional manner to produce an electrical energy output in the form of an ion current illustrated by curve $i$ in FIG. 2. The magnitude of the ion current $i$ is proportional to the sensed vacuum pressure. Because the primary winding 15 is open circuited by the open switch contacts 37, the capacitor 11 is charged by this ion current thereby accumulating the electrical energy represented thereby. Simultaneously, current drawn from the battery 33 charges the capacitor 35 until the voltage applied to the emitter electrode fires the unijunction transistor 31 producing a signal pulse at the base of the NPN transistor 23 and allowing energizing current flow through the chopper relay winding 32 until the unijunction 31 is shut off by discharge of the capacitor 35.

Energization of the relay winding 32 closes the associated contacts 37 allowing the capacitor 11 to discharge through the primary winding 15. As is well known, the unijunction oscillator 26 functions as an electrical clock with the transistor 31 firing at uniformly spaced time intervals. Therefore the chopper relay contacts 37 also are closed at uniformly spaced time intervals and produce output pulses in the primary winding 15. These pulses induce in the secondary winding 16 stepped-up voltage spikes $v$ (FIG. 2) which are applied across the gate and cathode electrodes of the rectifier 17. If the magnitude of a voltage spike $v$ is less than that required to fire the rectifier 17, no change will occur. However, if a voltage spike $v$ is large enough to fire the rectifier 17, energizing current is conducted through the control relay winding 18. This current flow continues until the next firing of the unijunction 31 which feeds a firing pulse to the base of the transistor 23. Momentary conduction by the transistor 23 shuts off the rectifier 17 until another pulse of sufficient magnitude is applied by the secondary winding 16. Provided that the subsequent voltage pulse $v$ received from the secondary winding 16 is sufficiently large to again fire the rectifier 17, the momentary nonconductance of the rectifier 17 caused by firing of the NPN transistor 23 will not open the contacts 19 because the nonconducting period is shorter than the release time of the relay.

The unijunction oscillator 26 provides a limited energy storage period of, for example, 20 seconds during which the capacitor 11 does not become fully charged. Therefore, the level of energy accumulated by the storage capacitor 11 is proportional to the value of the charging current $i$ derived from the ionization tube 12 which is in turn proportional to the sensed vacuum pressure. Also proportional to that pressure is the magnitude of the output voltage spike $v$ produced by closing of the chopper contacts 37. Thus, one can provide a silicon controlled rectifier 17 which is fired by an output voltage spike $v$ resulting from a given predetermined stored energy level in the storage capacitor 11 and a corresponding particular vacuum pressure in the sensed environment.

In a typical application, one would provide, for example, a rectifier 17 that becomes conductive upon the sensing of a given minimum vacuum desired in the environment under test. As long as the sensed vacuum remains above the desired minimum value, the rectifier 17 is not fired by each closure of the relay contacts 37 and the control relay winding 18 remains deenergized. This maintains the normally open control contacts 19 open and the vacuum pump 32 inactive. However, a reduction in the sensed vacuum to below the desired minimum produces an increased ion current $i$ and correspondingly larger voltage spike $v$ of sufficient magnitude to fire the rectifier 17. The resultant energization of the control relay winding 18 closes the control contacts 19 and activates the vacuum pump 22 which reduces system pressure until the desired minimum vacuum is again achieved.

It will be obvious that a similar arrangement could be utilized to control a desired maximum vacuum. In this case, one would provide a rectifier 17 which would be fired only by stored energy levels derived from ion currents corresponding to a vacuum pressure below the desired maximum. Thus, for vacuum pressures below the desired maximum, the relay winding 18 would be energized, the contacts 19 closed and the vacuum pump 22 activated. However, upon attainment of the desired maximum vacuum, the resultant voltage spikes $v$ would no longer fire the rectifier 17 to energize the winding 18. Accordingly, the switch contacts 19 would open to deactivate the vacuum pump 22.

Figure 3:
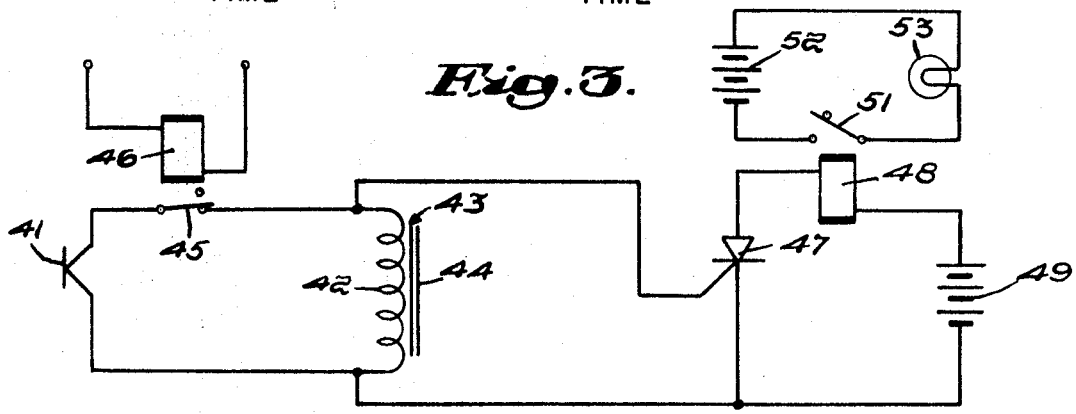
FIG. 3 is a schematic diagram of another embodiment of the invention.

It will be appreciated that, although the magnitudes of the voltage spikes $v$ detected by the rectifier switch 17 are proportional to the magnitude of the ion current generated by the ionization tube 12, the instantaneous energy level available for detection upon discharge of the storage capacitor 11 is substantially greater than the steady state energy level of the corresponding ion current. For this reason the problems associated with low energy measurement are significantly reduced and the required cost of electrical components is materially lowered. Referring now to FIG. 3, there is shown another embodiment of the invention wherein the thermocouple element 41 is connnected to the single winding 42 of the Toroid 43 having the magnetic core 44. Connected between the thermocouple 41 and the Toroid winding 42 are the normally closed switch contacts 45 associated with the relay winding 46. The winding 46 is adapted preferably for periodic energization at uniform time intervals by a suitable control circuit which can be, for example, similar to the unijunction oscillator circuit 26 shown in FIG 1. The output winding 42 is connected across the gate and cathode electrodes of the silicon controlled rectifier 47. Connected in series between the anode and cathode electrodes of the rectifier 47 are the control relay winding 48 and the battery 49. Associated with the control relay winding 49 are the normally open control contacts 51 connected in series with the battery 52 and the signal lamp 53.

In typical use of this embodiment, the thermocouple be mounted to sense the ambient temperature in an environment of interest. With the relay contacts 45 closed, thermocouple current flows through the Toroid winding 42 and the energy represented thereby is accumulated as electromagnetic energy in the Toroid core 44. Upon opening of the contacts 45 by energization of the relay winding 46, the magnetic field collapses and the accumulated energy generates a high voltage spike in the output winding 42. This spike is applied to the gate electrode of the rectifier 47 and if of sufficient magnitude renders it conductive. Firing of the rectifier 47 produces energizing current flow through the control relay winding 48 which in turn closes the control contacts 51 and activates the signal lamp 53.

Again assuming limited periods of uniform length between periodic opening of the contacts 45 by the winding 46, the electromagnetic energy level accumulated in the Toroid 43 is proportional to the voltage generated by the thermocouple 41 which is in turn proportional to the sensed ambient temperature. Also proportional to that ambient temperature are the magnitudes of the periodic voltage spikes generated by openings of the contacts 45.

In a typical application, the embodiment of FIG. 3 can be used for excessive temperature detection. A rectifier 47 is provided which requires for firing a given predetermined discharging energy level. This energy level is determined by calculating the energy level which will accumulate in the Toroid 43 with a thermocouple voltage corresponding to a desired maximum ambient temperature. Sensed ambient temperatures below this maximum do not produce accumulated energy levels sufficient to fire the rectifier 47 and the signal lamp 53 remains deenergized. However, upon occurrence of the maximum temperature, the Toroid winding 42 produces a voltage spike of sufficient magnitude to fire the rectifier 47 and energize the relay winding 48. An indication of the excessive temperature is provided by the resultant energization of the signal lamp 53.

As in the embodiment illustrated in FIG. 1, the accumulation of electrical energy by the Toroid 43 before periodic discharge increases the energy level available for measurement by the rectifier 47. Thus, less demanding capabilities are required of both the measuring circuits and the individual components therein.

Obviously, many modifications and variations of the present invention are possible in light of the above teachings. For example, it will be obvious that condition responsive low energy sources other than the illustrated ionization tube 12 and thermocouple element 41 can be advantageously utilized with the invention. Similarly, the illustrated control and signaling output functions of the invention are merely exemplary and a wide variety of other control, indicating, and regulation functions can be accomplished with the inventive concepts described and shown. It is, therefore, to be understood that within the scope of the appended claims the invention can be practiced otherwise than as specifically described.

I claim:

1. A sensing apparatus comprising a condition responsive source means adapted to generate a low energy electrical output signal proportional to a sensed variable condition, an energy storage means coupled to said condition responsive means and adapted to accumulate energy received therefrom, output circuit means coupled to said energy storage means, electrical switch means connected between said source means and said energy storage means, switch control means operatively coupled to said switch means and adapted to automatically and repetitively produce alternating energy storing periods of uniform duration wherein energy at relatively low power levels provided by said condition responsive means is accumulated by said energy storage means and energy discharge periods of substantially shorter duration than said energy storing periods, said energy accumulated by said energy storage means being substantially instantaneously discharged into said output circuit means during said discharge periods at power levels substantially greater than said relatively low power levels, measuring means coupled to said output circuit means and adapted to receive and measure during said energy discharge periods the energy received from said energy storage means, condition control means for controlling the variable condition sensed by said condition responsive source means, said condition control means being operatively coupled to said measuring means and responsive to the level of energy received thereby from said energy storage means.

2. A sensing apparatus according to claim 1 wherein said measuring means is adapted to produce an amplified control signal in response to reception of a predetermined energy level from said energy storage means.

3. A sensing apparatus according to claim 1 wherein said electrical switch means comprises switch contacts and a periodically energized relay winding.

4. A sensing apparatus according to claim 3 wherein said switch control means periodically energizes said relay winding.

5. A sensing apparatus according to claim 1 wherein said energy storage means comprises an electrical capacitor connected to said condition responsive means, and said electrical switch means is connected between said capacitor and said output circuit means.

6. A sensing apparatus according to claim 5 wherein said measuring means is adapted to produce an amplified control signal in response to the reception of a predetermined energy level from said energy storage means.

7. A sensing apparatus according to claim 6 wherein said electrical switch means comprises switch contacts connected between said capacitor and said output circuit means, and a periodically energized relay winding.

8. A sensing apparatus according to claim 6 wherein said switch control means periodically energizes said relay winding.

9. A sensing apparatus according to claim 8 wherein said measuring means comprises a solid-state switching means adapted for actuation by said predetermined energy level to produce said control signal.